United States Patent [19]

Takahashi

[11] Patent Number: 4,735,491
[45] Date of Patent: Apr. 5, 1988

[54] OPTICAL SYSTEM FOR ENDOSCOPES

[75] Inventor: Susumu Takahashi, Hachiouji, Japan

[73] Assignee: Olympus Optical Co., Ltd., Tokyo, Japan

[21] Appl. No.: 686,925

[22] Filed: Dec. 27, 1984

[30] Foreign Application Priority Data

Dec. 28, 1983 [JP] Japan .................. 58-245548
Jan. 12, 1984 [JP] Japan .................. 59-004022

[51] Int. Cl.$^4$ .................. G02B 23/26; G02B 23/02
[52] U.S. Cl. .................. 350/413; 350/96.31; 350/445; 350/447; 350/450
[58] Field of Search .................. 350/96.26, 96.31, 413, 350/414, 445, 447, 450

[56] References Cited

U.S. PATENT DOCUMENTS

| | | | |
|---|---|---|---|
| 3,936,149 | 2/1976 | Imai | 350/96.31 |
| 4,042,295 | 8/1977 | Yamasita et al. | 350/445 |
| 4,101,196 | 7/1978 | Imai | 350/413 X |
| 4,138,192 | 2/1979 | Yamasita | 350/447 X |

FOREIGN PATENT DOCUMENTS

| | | |
|---|---|---|
| 2458306 | 6/1975 | Fed. Rep. of Germany . |
| 1967105 | 6/1977 | Fed. Rep. of Germany . |
| 2640353 | 3/1978 | Fed. Rep. of Germany . |
| 2919205 | 11/1979 | Fed. Rep. of Germany . |
| 3025186 | 1/1981 | Fed. Rep. of Germany . |
| 3029799 | 2/1981 | Fed. Rep. of Germany . |
| 51-40469 | 11/1976 | Japan . |

*Primary Examiner*—John K. Corbin
*Assistant Examiner*—Scott J. Sugarman
*Attorney, Agent, or Firm*—Cushman, Darby & Cushman

[57] ABSTRACT

An optical system for endoscopes provided with a retrofocus type or two convex lenses type objective, a relay lens consisting of a graded refractive index lens for relaying an image of the objective and an eyepiece system for observing the image relayed by the relay lens, in order to make it possible to obtain a clear and high quality image of a wide visual field. The objective includes an aperture stop and a field stop provided between the objective and relay lens. The objective comprises a front lens group and rear lens group. The front lens group can be formed as of a straight viewing type, side viewing type or oblique viewing type. The rear lens group is movable along the optical axis through the relay lens.

7 Claims, 4 Drawing Sheets

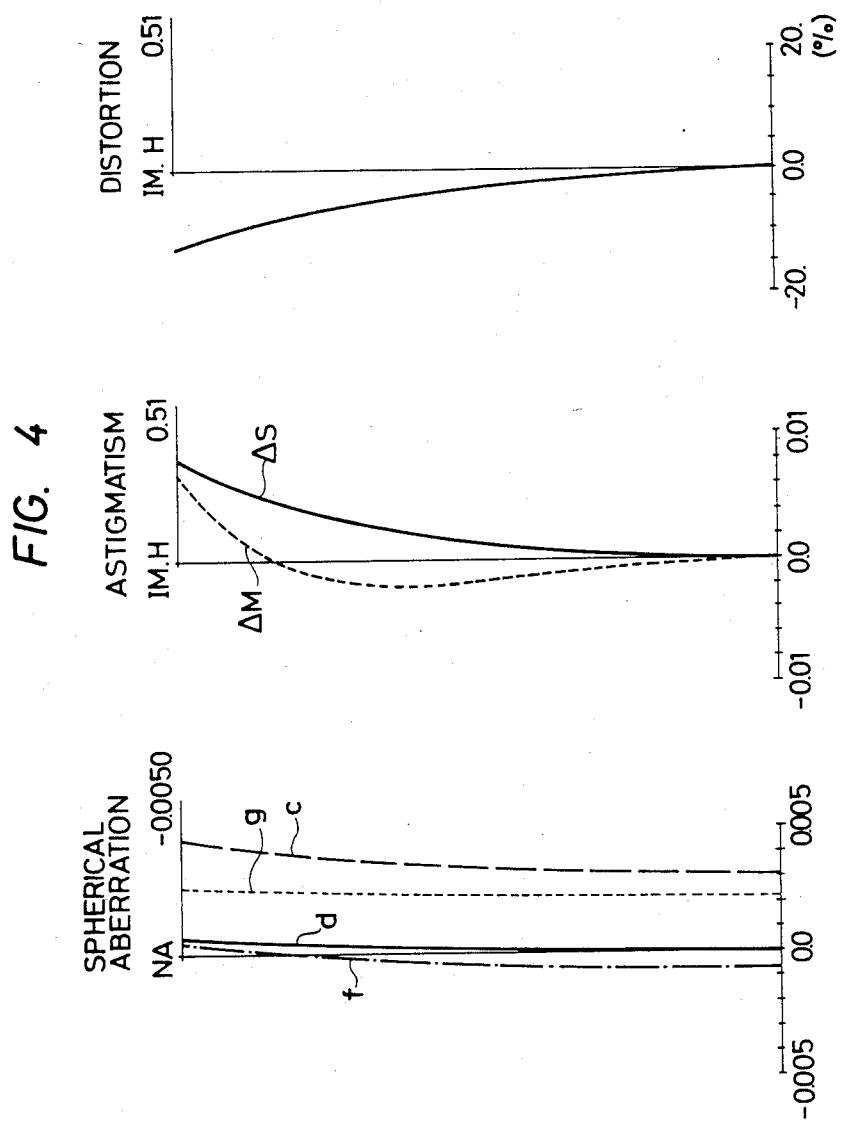

OPTICAL SYSTEM FOR ENDOSCOPES

BACKGROUND OF THE INVENTION

1. Field of the Invention

This invention relates to an optical system adapted for endoscopes and more particularly for endoscopes for infant inspection or industrial use.

2. Description of the Prior Art

It is preferable that the endoscope for infant inspection or industiral use is as fine as possible. Therefore, an endoscope wherein such graded refractive index lens as a Selfoc lens (trade name) is used for the objective lens and relay lens has been developed. For example, as shown in FIG. 1, the optical system of such conventional endoscope is formed of an objective 1, a relay lens 2 consisting of a graded refractive index lens connected to the objective lens 1, a field lens 3 and an eyepiece 4 so that an image O' of an object O may be formed by the objective 1 on its rear end surface and may be relayed through the relay lens 2 to be formed on its rear end surface as an image O" which may be magnified and observed with an eyepiece system consisting of the field lens 3 and eyepiece 4. However, in the objective 1 consisting of the graded refractive index lens, the chromatic aberration can not be corrected and therefore has been so large as to be, for example, 40μ(c-line to f-line) in the lateral chromatic aberration and 100μ (c-line to f-line) in the longitudinal chromatic aberration. Also, in this objective 1, the monochromatic aberration can not be corrected and therefore there has been a problem that the resolving power is low. Further, in this objective 1, there is today no angle of view more than 60 degrees and therefore there has been a problem that no wide angle of view can be selected. Also, in this objective 1, the part in which the light ray height is low is so short as a characteristic of the graded refractive index lens that it is difficult to bend the optical axis by contriving said part and, as a result, there has been a problem that the oblique viewing is very difficult. Further, there have been problems that, as a characteristic of the graded refractive index lens, in case the entire end surface is utilized to form an image, the light amount on the peripheral side of the visual field will become zero and no photograph will be taken, stripes will appear on the image, the image will be disturbed, the peripheral edge of the visual field will be cracked and the peripheral side of the visual field will be very hard to see. Also, there has been a problem that, in the case of the optical system shown in FIG. 1, if a field stop is provided on the rear surface of the relay lens 2, the focus deviation will be added within the relay lens 2 and therefore it will be difficult to make the field stop and image position coincide with each other. There have been problems that, in such conventional optical system, as no aperture stop has been provided, even an unnecessary light bundle will come in and, as a result, a flare will be produced and the contrast will deteriorate.

SUMMARY OF THE INVENTION

In view of the above mentioned problems, a primary object of the present invention is to provide an optical system for endoscopes wherein the chromatic aberration can be deleted, the resolveing power improves, a wide angle of view can be freely selected, an oblique viewing is easy, even the peripheral side of the visual field can be photographed, a favorable image can be obtained and is very easy to see, it is easy to make the field stop and image position coincide with each other and an image in which no flare is produced and the contrast is favorable can be obtained.

According to the present invention, this object is attained by providing an objective of a retrofocus type (inverted telephoto type) or two convex lenses type, a relay lens consisting of a graded refractive index lens relaying an image formed by the objective and an eyepiece system for observing the image relayed by the relay lens. Thereby, the chromatic aberration and other various aberrations relating to the image to be formed can by corrected, the angle of view can be freely selected and it is so easy to bend the optical axis with a prism or the like that the part in which the light ray height is low can be made long.

According to a preferred formation of the present invention, a field stop is provided between the rear surface of the objective and the front surface of the relay lens so that the marginal part of the end surface of the relay lens may be removed from the visual field and, when the field stop and image position are to be made to coincide with each other, the focus position deviation with the relay lens will no be added.

According to another formation of the present invention an aperture stop is provided within the objective so that any unnecessary light bundle may be cut.

This and other objects of the present invention will become more apparent during the course of the following detailed description and appended claims.

BRIEF DESCRIPTION OF THE DRAWINGS

FIG. 4 shows aberration curve diagrams of the objective of FIG. 2;

DESCRIPTION OF THE PREFERRED EMBODIMENTS

Figure 1:
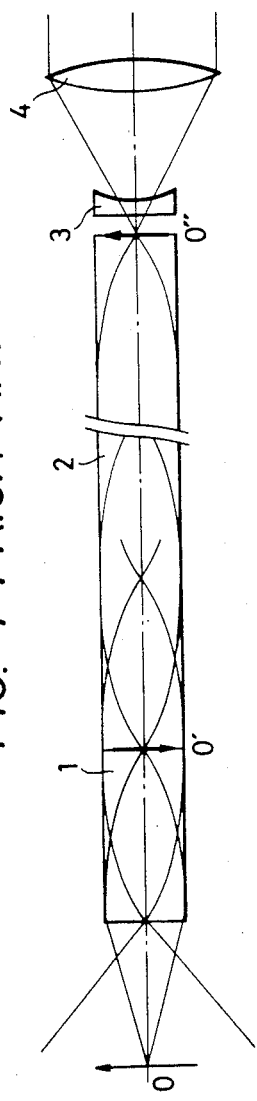
FIG. 1 is a view showing an optical system for conventional endoscopes.

In the following, the present invention shall be explained in detail on the basis of the embodiment shown in FIG. 2. The symbol $L_1$ denotes a front lens group made by cementing a plano-concave lens 11, a glass block 13 having a stop 12 therein and a plano convex lens 14 and $L_2$ denotes a rear lens group made by cementing a biconvex lens 15 and a plano-concave lens 16 a retrofocus type objective is formed by the front and rear lens groups $L_1$ and $L_2$. A field stop 17 is provided between the rear end surface of the rear lens group $L_2$ (the rear end surface of the plano-convex lens 16) and the front end surface of the relay lens 2 (graded refractive index lens) and both end surfaces are cemented together. An eyepiece system arranged behind the relay lens 2 is formed by a field lens 3 and an eyepiece 4.

Figure 3:
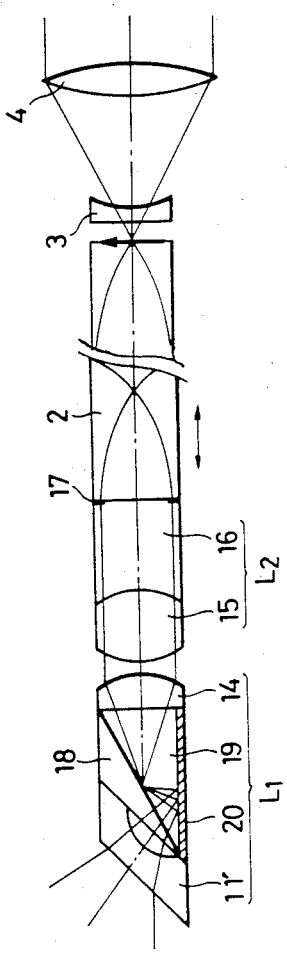
FIG. 3 is a view showing an example wherein the objective of FIG. 2 is made for oblique viewing.

The optical system for endoscopes according to the present invention is so formed as is described above and includes the retrofocus type objective. Therefore, by correcting the chromatic aberration, for example, a lateral chromatic aberration of $2\mu$ and a longitudinal chromatic aberration of $2\mu$ can be substantially made. As shown in FIG. 4, also such various aberrations as a spherical aberration, astigmatism and distortion can be considerable corrected and therefore the resolving power will improve. Further, a wide angle of view can be freely set. For exmaple, an angle of view up to about 140 degrees can be obtained. As the optical path length can be made long in the part in which the light ray height is low near the stop 12, the optical axis can be bent with that part as a prism, and thereby oblique viewing is very easy. For example, as shown in FIG. 3, in the front lens group L, if an oblique concave lens 11' is used instead of the plano-concave lens 11 and two prisms 18 and 19 are used in combination instead of the glass block 13, the objective will become an oblique viewing optical system. By the way, the reference numeral 20 denotes such reflecting film as of aluminum covering the bottom surface (side surface to be a reflecting surface) of the prism 19.

In the optical system for endoscopes according to the present invention, as the field stop 17 is provided between the rear surface of the objective and the front surface of the relay lens 2, the marginal part of the end surface of the relay lens 2 will be removed from the visual field. Therefore, the part of and near the zero light amount will be removed, the visual field will become bright up to the marginal part and the entire visual field will be able to be photographed. Also, the marginal part of the image, which has stripes will be removed from the visual field and therefore a favorable image will be obtained up to the marginal part of the visual field. Further, irregularities on the peripheral edge of the visual field will be hidden and the peripheral edge will become so clear that the visual field will become easy to see up to the marginal part. As the field stop 17 is provided in front of the relay lens 2, in the case of making the field stop 17 and image position coincide with each other, the focus position deviation within the relay lens 2 will not be added and the field stop 17 and image position will be able to be made to coincide with each other by only adjusting the objective.

In the optical system for endoscopes according to the present invention, as the objective is formed of two groups both of which are cemented lenses and the rear lens group $L_2$ is cemented to the relay lens 2, no spacer tube will be required and, as a result, the eclipse, which is conventionally caused by the spacer tube, will be eliminated and the brightness on the marginal part of the visual field will increase. By moving the rear lens group through the relay lens 2 from the objective side as shown by the arrow, the distance between the front lens group $L_1$ and rear lens group $L_2$ can be adjusted and therefore the focus can be adjusted.

Figure 2:
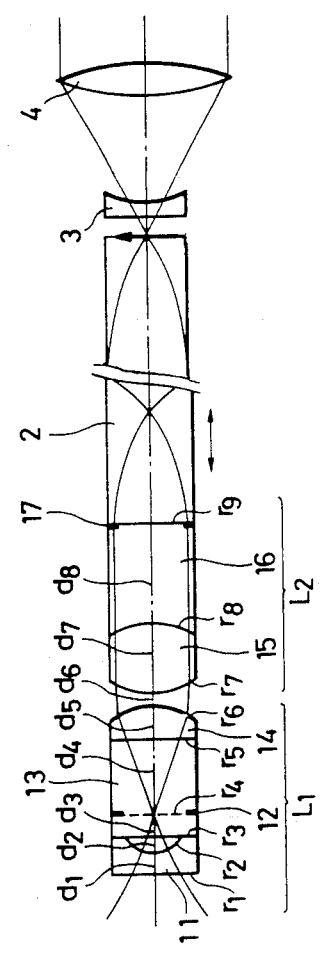
FIG. 2 is a view showing an objective of an embodiment of an optical system for endoscopes according to the present invention.

The numerical data of the embodiment shown in FIG. 2 are shown in the following.

| $f = 1$ | | |
|---|---|---|
| $r_1 = \infty$ | | |
| $d_1 = 0.2537$ | $n_1 = 1.51633$ | $\nu_1 = 64.15$ |
| $r_2 = 0.7638$ | | |
| $d_2 = 0.1396$ | | |

-continued

| $f = 1$ | | |
|---|---|---|
| $r_3 = \infty$ | | |
| $d_3 = 1.9284$ | $n_2 = 1.78590$ | $\nu_2 = 44.18$ |
| $r_4 = \infty$ (Stop) | | |
| $d_4 = 2.1948$ | $n_3 = 1.78590$ | $\nu_3 = 44.18$ |
| $r_5 = \infty$ | | |
| $d_5 = 0.7232$ | $n_4 = 1.78590$ | $\nu_4 = 44.18$ |
| $r_6 = -2.3027$ | | |
| $d_6 = 0.5836$ | | |
| $r_7 = 2.0908$ | | |
| $d_7 = 1.2687$ | $n_5 = 1.64250$ | $\nu_5 = 58.37$ |
| $r_8 = -1.5757$ | | |
| $d_8 = 3.3747$ | $n_6 = 1.78472$ | $\nu_6 = 25.71$ |
| $r_9 = \infty$ | | | where the symbol f represents a focal distance of the objective, $r_1, r_2, \ldots$ represent radii of curvature of the respective lens surfaces of the objective, $d_1, d_2, \ldots$ represent thicknesses and air spaces of the respective lens elements of the objective, $n_1, n_2, \ldots$ represent refractive indices of the respective lens elements of the objective and $\nu_1, \nu_2, \ldots$ represent Abbe's numbers of the respective lens elements of the objective.

Figure 5:
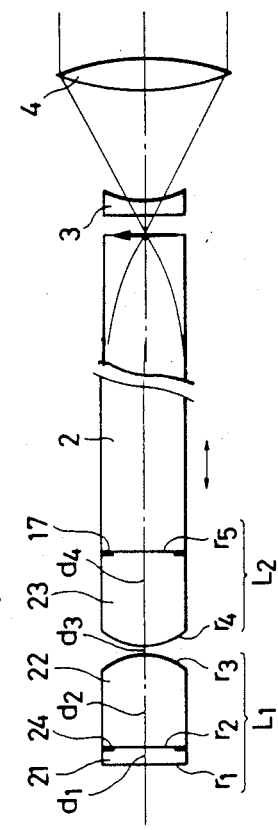
FIG. 5 is a view showing another embodiment of the optical system for endoscopes according to the present invention.
Figure 6:
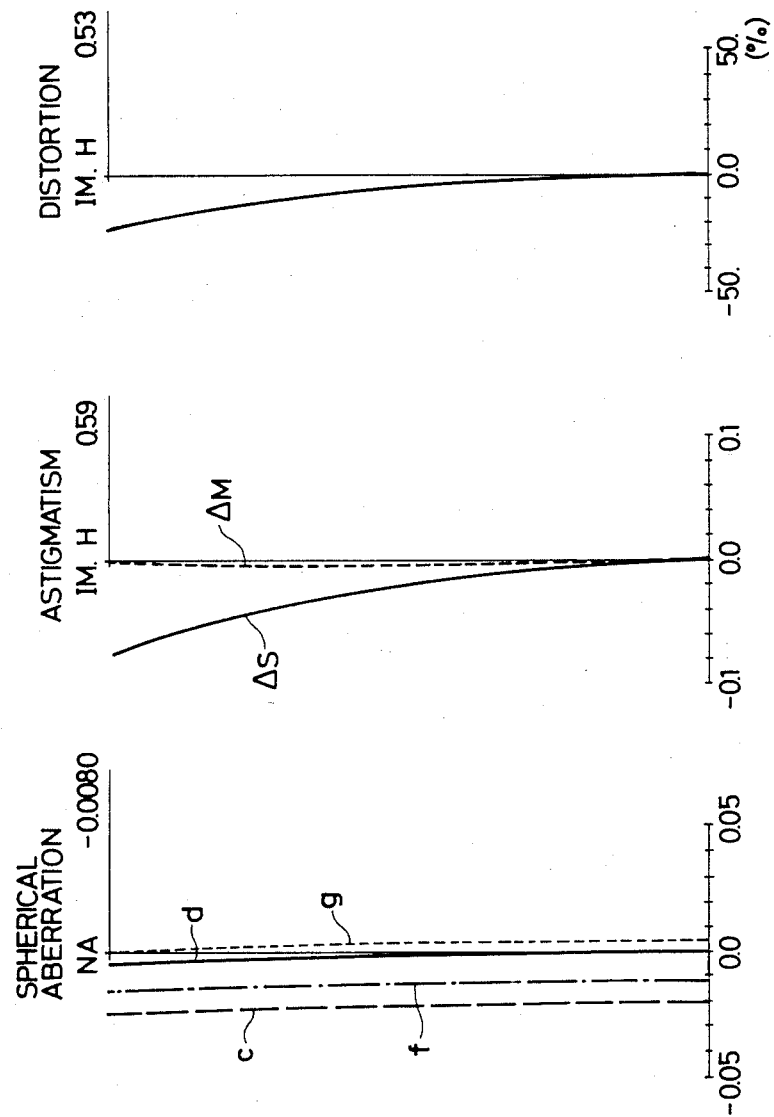
FIG. 6 shows aberration curve diagrams of the objective of FIG. 5.

In FIG. 5 is shown another embodiment of the present invention. This embodiment is different from the embodiment shown in FIG. 2 in respect that the front lens group $L_1$ consists of a glass block 21 and plano-convex lens 22 cemented to each other, the rear lens group $L_2$ consists of a plano convex lens 23 and an aperture stop 24 is provided on the cemented surfaces of the glass block 21 and plano-convex lens 22. That is to say, in this embodiment, as the objective is formed as of a two plano-convex lenser type, by correcting the chromatic aberration, the chromatic aberration can be substantially deleted so that, for example, the lateral chromatic aberration may be $10\mu$ (c-line to f-line) and the longitudinal chromatic aberration may be of $13\mu$ (c-line to f-line). Also, as shown in FIG. 6 such monocromotic aberration as the spherical aberration, astigmatism and distortion can be considerably corrected and therefore the resolving power will improve. Further, a wide angle of view can be freely obtained, for example, up to 100 degrees. As the aperture stop 24 is provided within the objective, if the diameter of the sperture stop 24 is varied while considering the balance of the necessary depth of focus and the brightness, any unnecessary light bundle will be able to be cut and, as a result, no flare will be produced and the contrast of the image will improve. The other points are the same as are described on the embodiment of FIG. 2. The numerical data of this embodiment are shown in the following.

| $f = 1$ | | |
|---|---|---|
| $r_1 = \infty$ | | |
| $d_1 = 0.4924$ | $n_1 = 1.51633$ | $\nu_1 = 64.15$ |
| $r_2 = \infty$ (Aperture stop) | | |
| $d_2 = 1.3294$ | $n_2 = 1.80610$ | $\nu_2 = 40.95$ |
| $r_3 = -1.5428$ | | |
| $d_3 = 0.1641$ | | |
| $r_4 = 1.5428$ | | |
| $d_4 = 1.7562$ | $n_3 = 1.80610$ | $\nu_3 = 40.95$ |
| $r_5 = \infty$ | | | where the symbol f represents a focal distance of the objective, $r_1, r_2, \ldots$ represent radii of curvature of the respective lens surfaces of the objective, $d_1, d_2, \ldots$ represent thicknesses and air spaces of the respective lens elements of the objective, $n_1, n_2, \ldots$ represent refractive indices of the respective lens elements of the objective and $\lambda_1, \lambda_2, \ldots$ represent Abbe's numbers of the respective lens elements of the objective.

Figure 7:
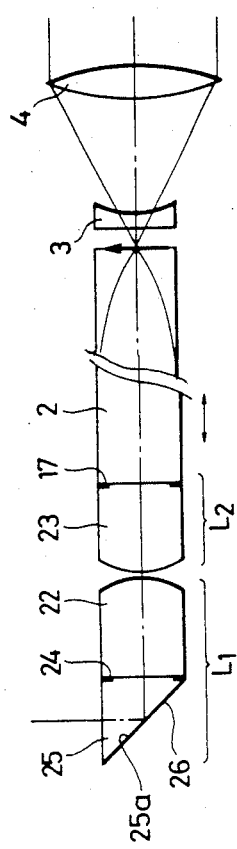
FIGS. 7 to 9 are views respectively showing objectives portion of other further respectively different embodiments of the optical system for endoscopes according to the present invention.
Figure 9:
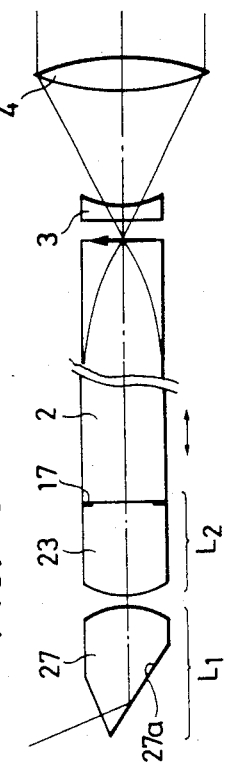
Figure 8:
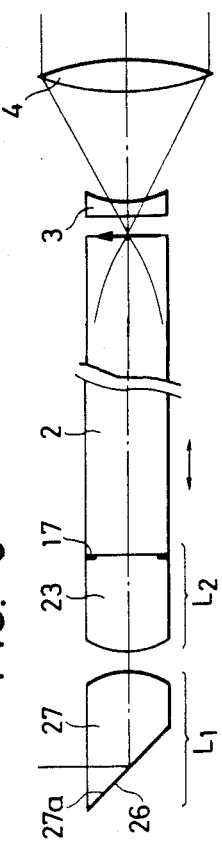

FIG. 7 shows an important portion of further another embodiment of the present invention. In this embodiment, a side viewing prism 25 having a reflecting surface 25a of 45 degrees is cemented on the front end surface of the plano convex lens 22 to form the front lens group L so that side viewing may be possible. By the way, the reference numeral 26 denotes such film as of aluminum covering the reflecting surface 25 of the side viewing prism 25 from outside but need not be particularly provided if a total reflection is made on the reflecting surface 25a. FIG. 8 shows an important portion of further another embodiment of the present invention. This is also for side viewing. Therein, the plano-convex lens 22 and side viewing prism 25 in FIG. 7 are made integral to be a reflection and refraction element 27 having a reflecting surface 27a so that the number of component parts may be reduced and cemented parts may be decreased to make the assembly easy and the production cost low. FIG. 9 shows an important portion of still another embodiment of the present invention. In this embodiment, the angle of the reflecting surface 27a of the reflection and refraction element 27 in FIG. 8 is made smaller than 45 degrees to enable oblique viewing. By the way, in either of the embodiments shown in FIGS. 8 and 9, the outer periphery of the reflection and refraction element 27 is formed to be circular except in the chamfered upper side part, as s result, the reflection and refraction element 27 can be supported with a tubular frame the same as the other optical elements (plano-convex lens 23 and relay lens 2) and therefore there is an advantage that the structure is simple. In any of these embodiments, the rear lens group $L_2$ is arranged movably along the optical axis through the relay lens 2 as indicated by the arrow to make focus adjustment possible.

What is claimed:

1. An optical system for endoscopes comprising:
   an objective composed of a first plano-convex lens having a convex surface on an image side and a second plano-convex lens with a convex surface directed to an object side;
   a field stop provided in contact with a plane surface of said second plano-convex lens with the convex surface directed to the object side;
   a relay lens composed of a graded refraction index rod lens cemented to the plane surface of said second plano-convex lens so as to hold said field stop between the rod lens and the plane surface of siad second plano-convex lens,
   said relay lens being movable longitudinally integral with said second plano-convex lens for focus adjustment; and
   an eyepiece system provided on the exit side of said relay lens.

2. An optical system for endoscopes comprising:
   an objective composed of a first plano-convex lens having a convex surface on an image side and a second plano-convex lens with a convex surface directed to a object side;
   a field stop provided in contact with a plane surface of said second plano-convex lens with the convex surface directed to the object side
   a relay lens composed of a graded refraction index rod lens cemented to the plane surface of second plano-convex lens so as to hold said field stop between the rod lens and the plane surface of said second plano-convex lens,
   an eyepiece system provided on the exit side of said relay lens; and
   a side viewing prism having a reflecting surface and cemented to a plane surface of an incident side of said first plano-convex lens.

3. An optical system for endoscopes comprising:
   an objective composed of a first plano-convex lens having a convex surface on an image side and a second plano-convex lens with a convex surface directed to an object side;
   a field stop provided in contact with a plane surface of said second plano-copnvex lens with the convex surface directed to the object side;
   a relay lens composed of a graded refraction index rod lens cemented to the plane surface of said second plano-convex lens so as to hold said field stop between the rod lens and the plane surface of said second plano-convex lens,
   an eyepiece system provided on the exit side of said relay lens; and
   said first plano-convex lens and said side viewing prism being integrally formed as a single glass block, without being cemented on each other.

4. An optical system for endoscopes comprising:
   an objective of a retrofocus type composed of a front lens group including a negative lens having a concave ssurface on an image side, and a plano-convex lens having a convex surface on the image side, and a rear lens group including a positive cemented lens formed by cementing a biconvex lens and a plano concave lens and having a plane surface on the image side;
   a field stop provided in contact with the plane surface of said cemented lens;
   a relay lens composed of a graded refractive index rod lens cemented to the plane surface of said cemented lens so as to hold said field stop between the rod lens and the plane surface of said cemented lens; and
   an eyepiece system provided on an exit side of said relay lens.

5. An optical system for endoscopes according to claim 4, wherein the negative lens of said front lens group is obliquely arranged with respect to an optical axis of said relay lens, a first prism and a second prism cemented to each other between said negative lens and said plano-convex lens having the convex surface on the image side of said front lens group are cemented to said negative lens and said plano-convex lens respectively, and optical axis of the negative lens of said front lens group is directed by said first and second prisms to be coincident with the optical axis of the relay lens.

6. An optical system for endoscopes comprising:
   an objective of a retrofocus type composed of a front lens group including a negative lens having a concave surface on an image side and a plano-convex lens having a convex surface on the image side, and a rear lens group including a positive cemented lens formed by cementing a biconvex lens and a plano-concave lens and having a plane surface on the image side;
   a field stop between the rod lens and the plane surface of said cemented lens; and
   a relay lens composed of a graded refractive index rod lens cemented to the plane surface of said cemented lens so as to hold said field stop between the rod lens and the plane surface of said cemented lens; and an eyepice system provided on an exit side of said relay lens, said objective having the following numerical data:

| $f = 1$ | | |
|---|---|---|
| $r_1 = \infty$ | | |
| $d_1 = 0.2537$ | $n_1 = 1.51633$ | $\nu_1 = 64.15$ |
| $r_2 = 0.7638$ | | |
| $d_2 = 0.1396$ | | |
| $r_3 = \infty$ | | |
| $d_3 = 1.9284$ | $n_2 = 1.78590$ | $\nu_2 = 44.18$ |
| $r_4 = \infty$ (Stop) | | |
| $d_4 = 2.1948$ | $n_3 = 1.78590$ | $\nu_3 = 44.18$ |
| $r_5 = \infty$ | | |
| $d_5 = 0.7232$ | $n_4 = 1.78590$ | $\nu_4 = 44.18$ |
| $r_6 = -2.3027$ | | |
| $d_6 = 0.5836$ | | |
| $r_7 = 2.0908$ | | |
| $d_7 = 1.2687$ | $n_5 = 1.64250$ | $\nu_5 = 58.37$ |
| $r_8 = -1.5757$ | | |
| $d_8 = 3.3747$ | $n_6 = 1.78472$ | $\nu_6 = 25.71$ |
| $r_9 = \infty$ | | | where the symbol f represents a focal distance of the objective, $r_1$ through $r_9$ represent radii of curvature of the respective lens surfaces of the objective, $d_1$ through $d_8$ represent thicknesses and air spaces of the respective lens elements of the objective, $n_1$ through $n_6$ represent refractive indices of the respective lens elements of the objective, and $\lambda_1$ through $\lambda_6$ represent Abbe's numbers of the respective lens elements of the objective.

7. An optical system for endoscopes comprising:

an objective composed of a first plano-conves lens having a convex surface on an image side and a second plano-convex lens with a convex surface directed to an object side;

a field stop provided in contact with a plane surface of said second plano-convex lens with the convex surface directed to the object side;

a relay lens composed of a graded refractive index rod lens cemented to the plane surface of said second plano-convex lens so as to hold said field stop between the rod lens and the plane surface of said second plano-convex lens, and an eyepice system provided on the exit side of said relay lens, said objective having the following numerical data:

| $f = 1$ | | |
|---|---|---|
| $r_1 = \infty$ | | |
| $d_1 = 0.4924$ | $n_1 = 1.51633$ | $\nu_1 = 64.15$ |
| $r_2 = \infty$ (Aperture stop) | | |
| $d_2 = 1.3294$ | $n_2 = 1.80610$ | $\nu_2 = 40.95$ |
| $r_3 = -1.5428$ | | |
| $d_3 = 0.1641$ | | |
| $r_4 = 1.5428$ | | |
| $d_4 = 1.7562$ | $n_3 = 1.80610$ | $\nu_3 = 40.95$ |
| $r_5 = \infty$ | | | where the symbol of f represents a focal distance, $r_1$ through $r_5$ represent radii of curvature of the respective lens surfaces of the objective, $d_1$ through $d_4$ represent thicknesses and air spaces of the respective lens elements of the objective, $n_1$ through $n_3$ represent refractive indices of the respective lens elements of the objective and $\nu_1$ through $\nu_3$ represents Abbe's numbers of the respective lens elements of the objective.

* * * * *